No. 678,692. Patented July 16, 1901.
H. G. ROTH.
TEA OR COFFEE POT.
(Application filed Feb. 11, 1901.)

(No Model.) 2 Sheets—Sheet 1.

Witnesses.
C. H. Turner.
Harry Kilgore.

Inventor:
Henry G. Roth.
By his Attorneys.
Williewson & Merchant

THE NORRIS PETERS CO., PHOTO-LITHO., WASHINGTON, D. C.

No. 678,692.  
H. G. ROTH.  
TEA OR COFFEE POT.  
(Application filed Feb. 11, 1901.)  
(No Model.)  
Patented July 16, 1901.  
2 Sheets—Sheet 2.

Witnesses  
C. H. Turner  
Harry Kilgore

Inventor.  
Henry G. Roth.  
By his Attorneys.  
Williamson Merchant

UNITED STATES PATENT OFFICE.

HENRY G. ROTH, OF MINNEAPOLIS, MINNESOTA, ASSIGNOR OF ONE-HALF TO CLARK E. WYMAN, OF SAME PLACE.

TEA OR COFFEE POT.

SPECIFICATION forming part of Letters Patent No. 678,692, dated July 16, 1901.

Application filed February 11, 1901. Serial No. 46,761. (No model.)

*To all whom it may concern:*

Be it known that I, HENRY G. ROTH, a citizen of the United States, residing at Minneapolis, in the county of Hennepin and State of Minnesota, have invented certain new and useful Improvements in Tea or Coffee Pots; and I do hereby declare the following to be a full, clear, and exact description of the invention, such as will enable others skilled in the art to which it appertains to make and use the same.

My present invention has for its especial object to improve the construction of teapots and coffee-pots; and to this end it consists of the novel devices and combinations of devices hereinafter described, and defined in the claims.

Experience has shown that good coffee or tea or certainly the best coffee or tea cannot be made unless the coffee-grounds in the one case or the tea-leaves in the other be removed from the liquid very soon after the proper steeping has taken place.

The principal object of my invention is to provide a tea or coffee pot with which it is impossible, or practically so, to pour the steeped liquid from the pot until after the grounds or leaves have been removed from or raised above the liquid and in which also it is impossible to replace the grounds or leaves in the liquid after they have been removed.

My invention is illustrated in the accompanying drawings, wherein like characters indicate like parts throughout the several views.

Figure 1:
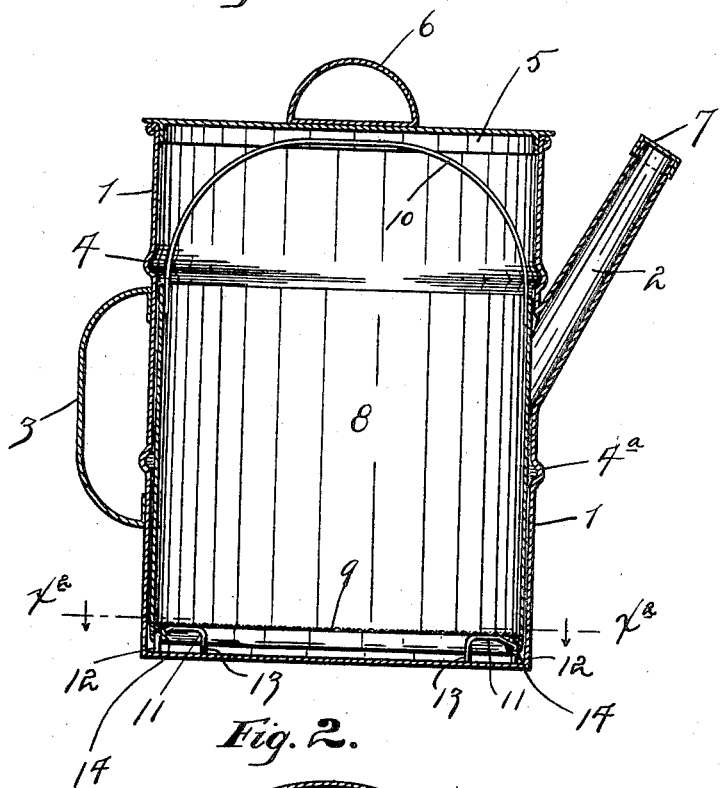
Figure 2:
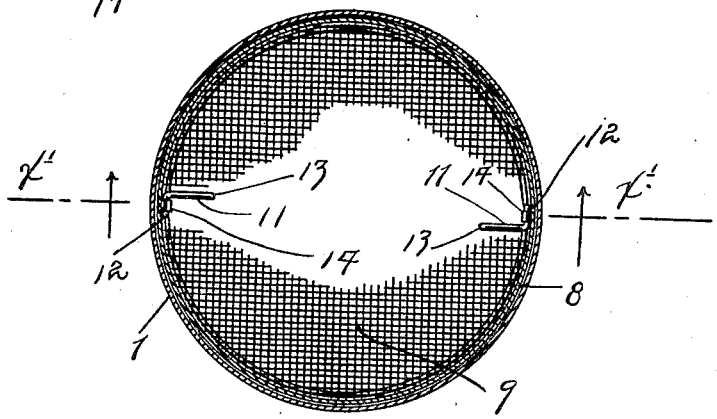
Figure 3:
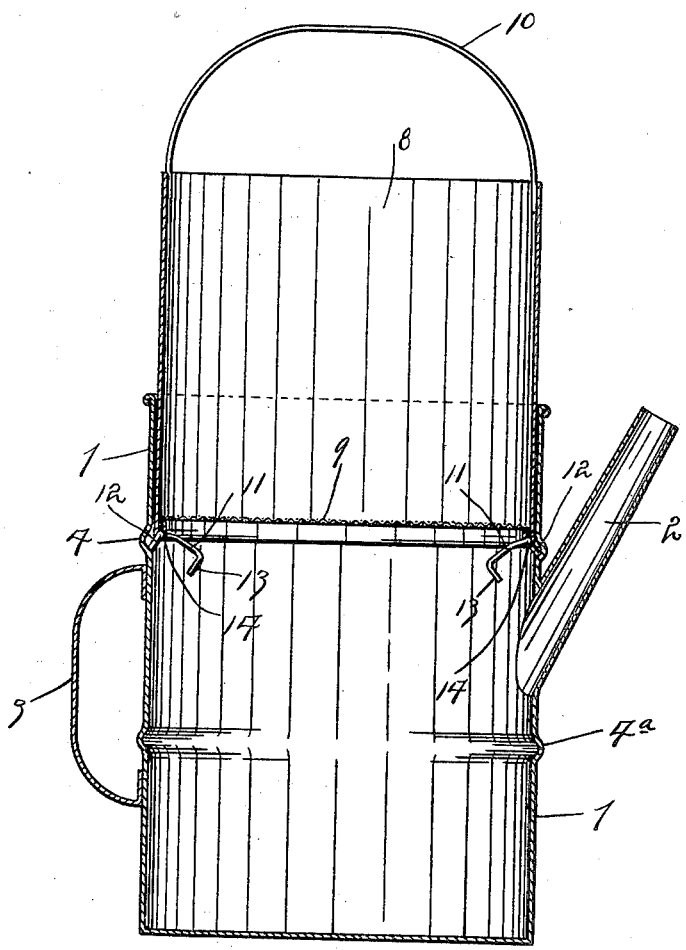
Figure 4:
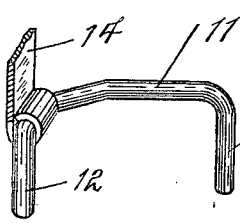

Figure 1 is a vertical section of a tea or coffee pot constructed in accordance with my invention, said section being taken on the line $x'$ $x'$ of Fig. 2. Fig. 2 is a horizontal section on the line $x^2$ $x^2$ of Fig. 1. Fig. 3 is a section on the same line as Fig. 1, but illustrating different positions of the parts; and Fig. 4 is a detail showing in perspective one of the so-called "lock-dogs" and a portion of the so-called "cup-valve" to which it is pivoted.

The numeral 1 indicates the cylindrical or cup-like body of the pot, the same having a spout 2 and a handle 3, the latter of which may, if desired, be made to fold against the cup. On a line above the lower end of the spout 2 the body 1 is provided with an outwardly-bulged annular lock-channel 4, for a purpose which will presently appear. The body 1 is provided with a lid 5, which, as shown, has a finger-piece 6. Also, as shown, the outer end of the spout 2 is adapted to be closed by cap 7.

An imperforate cylinder 8 fits snugly within the body 1 of the pot. At its lower end the cylinder 8 is provided with a reticulate head 9, as shown, formed of finely-woven-wire screen. At its upper end the said cylinder 8 is shown as provided with a bail 10, by means of which it may be lifted. The cylinder 8 and its bottom 9 afford a cup into which the ground coffee or the tea-leaves are placed. When the cylinder 8 is in working position, it closes off the passage into the spout 2, as best shown in Fig. 1, and thus acts as a valve. Hence I term the parts 8 9 the "cup-valve." Also by reference to Fig. 1 it will be noted that the reticulate bottom 9 normally stands some little distance above the bottom of the body 1. This is important for the reason it holds the coffee or the tea, as the case may be, out of direct contact with the bottom of the body 1, and thus prevents it from burning. Furthermore, this elevated support holds the coffee or the tea, so that the water has a better chance to bubble up and to percolate through the same.

The body or outside cup of the pot is preferably also provided with a second lock-channel $4^a$, which extends below the lower end of the spout 2.

The cup-valve 8 9 is provided with one or more lock-dogs for coöperation with the lock-channels 4 and $4^a$ of the pot-body 1, and, as shown, it is provided with two such dogs, located at diametrically opposite points. These dogs are preferably constructed each of a crank-like piece of wire 11, having depending ends 12 and 13. The crank portions of these dogs 11 are pivoted in curled ear-sections 14, formed in the lower edge of the cylinder 8.

When the parts stand as indicated in Fig. 1, the dogs 11 engage the bottom of the pot-body 1 and serve as supporting-feet for the so-called "cup-valve." The ends 13 of the dogs 11 are heavier than the ends 12, so that when the cup-valve 8 9 is lifted into the position indicated in Fig. 3 the ends 12 will be thrown by gravity into engagement with the lock-channel 4 of the pot-body 1, and thereby lock the said cup-valve in its raised position, with the bottom 9 thereof above the liquid contained in the pot. The dogs once having engaged the lock-channel, as above described, the cup-valve can be returned to the bottom of the pot 1 only by turning the entire device upside down, so that the heavy ends of the dogs fall back onto the reticulate bottom 9, in which position the ends 12 of said dogs will clear said lock-channels.

From the above description and statements made it is evident that the tea or coffee cannot be poured from the pot until after the cup-valve has been raised and locked in its elevated position and that the grounds or tea-leaves once having been removed from the liquid cannot be replaced therein. Of course the cup-valve may be entirely removed from the pot at any time. Usually, however, it would be left standing for a short time in its elevated position, (shown in Fig. 3,) so as to let the grounds or the leaves drain. The so-called "lock-dogs" therefore act to hold the so-called "cup-valve" in a draining position, as well as to prevent the same from being forced back down into the liquid.

It is often desirable to adjust the perforate support or bottom of the so-called "cup-valve" to different distances from the bottom of the body or outer cup 1. For instance, tea will be more satisfactorily treated when the said support is raised about half-way up through the body of the liquid or water within the pot. This is accomplished when the cup-valve is raised far enough to permit the lock-dogs to engage with the lower lock-channel 4$^a$.

The device above described is capable of many modifications within the scope of my invention. The cylinder 8 of the cup-valve is advisably made of imperforate material throughout, and it is preferably formed of very thin metal, so that it will adapt itself to closely fit and tightly close the opening into the spout 2. The best form of the pot-body 1 is that of a cylinder; but it might be angular in cross-section so far as the broad idea of my invention is concerned. With the parts cylindrical, as shown, and with the annular lock groove or channel 4 in the body 1 the telescoping parts may be put together without bringing them to any particular rotary adjustment.

This device may be constructed at a very small cost, and I contemplate making a very cheap form of the same to be used as an original package to contain tea, coffee, or similar commodities to be sold therewith and to be used for a short time, usually as long as the coffee or tea contained therein will last, and then to be thrown away. It will, however, also be made in much better and more expensive designs and be sold as an independent article.

When the so-called "cup-valve" is elevated, as shown in Fig. 3, it may be used as a so-called "minute" coffee-pot by pouring the hot water onto the ground coffee held thereby.

What I claim, and desire to secure by Letters Patent of the United States, is as follows:

1. The combination with a cup-like pot-body, having a lateral discharge opening or spout, of a cup-valve telescoping therewith, provided with a perforate bottom and serving as a valve to close said spout when in its operative position, and one or more gravity-actuated locks serving to hold said inner cup in an inoperative or elevated position, and themselves adapted to be thrown into inoperative positions when and only when the device is turned upside down, substantially as described.

2. The combination with the body 1 having the spout 2, and lock-channel 4, of the cup-valve 8, 9 telescoping into said body 1 and serving when in its operative or lowered position to close said spout, and the gravity-actuated lock-dogs pivoted to the bottom of said cup-valve, engageable with said lock-channel to hold said cup-valve in an inoperative position, which lock-dogs serve as supporting-feet when the said cup-valve is lowered, substantially as described.

3. The combination with the body or outer cup 1 having the spout 2 and lock channels or grooves 4 and 4$^a$, of the cup-valve 8, 9 with perforate bottom, and one or more gravity-actuated lock-dogs pivoted to the lower edge of said cup-valve, and coöperating with said lock-channel 4 and 4$^a$, substantially as described.

In testimony whereof I affix my signature in presence of two witnesses.

HENRY G. ROTH.

Witnesses:
 ANNE S. READ,
 F. D. MERCHANT.